United States Patent [19]

Miyake et al.

[11] Patent Number: 4,836,220
[45] Date of Patent: Jun. 6, 1989

[54] TOBACCO LEAF-STRIPPING MACHINE

[75] Inventors: Yasuhiko Miyake, Oyama; Katsuyuki Manzawa, Tochigi, both of Japan

[73] Assignee: Japan Tobacco, Inc., Tokyo, Japan

[21] Appl. No.: 30,737

[22] Filed: Mar. 26, 1987

[30] Foreign Application Priority Data

Sep. 24, 1986 [JP] Japan .................................. 61-223678

[51] Int. Cl.⁴ ............................................ A01O 45/16
[52] U.S. Cl. ................................... 460/130; 460/127; 460/130; 56/27.5
[58] Field of Search ........................ 56/27.5, 104, 105; 130/5 B, 5 C, 5 D, 5 E, 5 G, 5 J, 30 R, 30 J

[56] References Cited

U.S. PATENT DOCUMENTS

| | | | |
|---|---|---|---|
| 595,041 | 12/1897 | Butler | 130/30 J |
| 2,792,005 | 5/1957 | Lee | 130/5 B |
| 2,921,426 | 1/1960 | Heth | 130/5 B |
| 3,059,401 | 10/1962 | Woods | 56/27.5 |
| 3,600,876 | 8/1971 | Tanzer | 56/104 |
| 3,858,384 | 1/1975 | Maiste et al. | 56/104 |
| 4,292,982 | 10/1981 | Butcher | 56/27.5 |
| 4,407,305 | 10/1983 | Patterson | 130/31 R |

FOREIGN PATENT DOCUMENTS

| | | | |
|---|---|---|---|
| 0209887 | 1/1968 | U.S.S.R. | 56/27.5 |
| 0287448 | 11/1970 | U.S.S.R. | 56/27.5 |

*Primary Examiner*—John Weiss
*Attorney, Agent, or Firm*—Ladas & Parry

[57] ABSTRACT

The leaf-stripping machine of the present invention is provided with a pair of leaf-stripping rollers, the length of which is substantially the same as a tobacco stalk. The leaf-stripping rollers include a horizontal longitudinal axis, extend parallel to and are in rolling contact with each other. A holding frame, on which the tobacco stalk is placed in parallel to the leaf-stripping rollers, is located above the leaf-stripping rollers. The holding frame includes holding rods arranged at predetermined intervals in the longitudinal direction of the leaf-stripping rollers. The central portion of each holding rod is curved toward the leaf-stripping rollers, and is cut in such a manner as to provide a gap smaller than the diameter of the tobacco stalk. A plurality of partitioning plates are arranged under the leaf-stripping rollers, such that they are spaced from each other in the longitudinal direction of the leaf-stripping rollers.

8 Claims, 3 Drawing Sheets

TOBACCO LEAF-STRIPPING MACHINE

Background of the Invention

The present invention relates to a machine for stripping tobacco leaves off the stalks of tobacco plants which have been left to dry for a predetermined interval after being reaped, and more particularly, to a machine for stripping the tobacco leaves off the stalks while simultaneously classifying them into groups.

A tobacco leaf-stripping machine of this kind is disclosed in U.S. Pat. No. 4,407,305, for example. The machine disclosed in the U.S. Patent comprises: three pairs of leaf-stripping wheels, the wheels of each pair being in rolling contact with each other and rotatable in opposite directions around their horizontal axes. The three pairs of wheels are arranged laterally, in relation to the operator of the machine. A box for collecting tobacco leaves is located under each pair of wheels.

Using the above prior art machine, the operator, who stands in front of the machine, can strip the leaves off the stalk while simultaneously classifying them into groups. Specifically, the operator stands facing the machine, and holds a tobacco stalk such that its base portion is positioned on the first pair of leaf-stripping wheels, e.g., the pair located on the operator's right-hand side. The leaves on the base portion of the stalk are drawn between the leaf-stripping wheels, by the rotation thereof, are stripped off the stalk and drop into the corresponding collecting box. Thereafter, the operator rotates the stalk about its longitudinal axis, and moves it a certain distance back and forth. By so doing, any leaves remaining on the base portion are stripped off the stalk and drop into the collecting box.

Next, the operator holds the stalk such that its intermediate portion is positioned on the second pair of leaf-stripping wheels. By repeating the above operation, the leaves of the intermediate portion are stripped off the stalk and collected in a corresponding collecting box. After this, the leaves of the tip portion are stripped off the stalk and collected in a corresponding collecting box, by use of the third pair of leaf-stripping wheels.

Using the leaf-stripping machine described in the U.S. Patent, therefore, the leaves of the stalk can be stripped off and collected in the corresponding boxes, in accordance with the portions of the stalk on which they are located, i.e., the base, intermediate, and tip portions thereof.

It should be noted, however, that the operator must move the tobacco stalk from one pair of wheels to another, in order to completely strip off the leaves. In addition, the tobacco stalk must be moved back and forth along each pair of wheels, in order that any remaining leaves are stripped off. Therefore, the leaf-stripping operation necessary for one tobacco stalk remains time-consuming, even when using the machine of the U.S. Patent. Thus, the prior art machine does not enable the leaf-stripping operation to be performed with high efficiency.

SUMMARY OF THE INVENTION

Accordingly, the object of the present invention is to provide a tobacco leaf-stripping machine which is simple in construction, and which permits a leaf-stripping operation to be performed efficiently, while simultaneously classifying the tobacco leaves into groups.

This object is achieved by a tobacco leaf-stripping machine which comprises:

a pair of leaf-stripping rollers having substantially the same length as the stalk of a tobacco plant, the rollers extending horizontally parallel to each other, and being arranged in such a manner that they rotate in rolling contact with each other;

a holding frame which is so located above the paired leaf-stripping rollers as to be spaced therefrom by a predetermined distance, the holding frame allowing the tobacco stalk to be held in parallel to the leaf-stripping rollers and permitting the tobacco leaves of the stalk to hang down to be stripped off by the leaf-stripping rollers; and drive means for rotating the paired leaf-stripping rollers in opposite directions, so as to draw the tobacco leaves therebetween, whereby the tobacco leaves are drawn further inwards, in accordance with the rotation of the leaf-stripping rollers, and are finally stripped off the stalk.

With the above leaf-stripping machine, the entire tobacco stalk can be placed on the holding frame such that it is held in parallel to the paired leaf-stripping rollers. The tobacco leaves of the stalk placed on the holding frame hang down to be stripped off by the leaf-stripping rollers. By then rotating the rollers in opposite directions, the tobacco leaves are drawn therebetween. Since the stalk itself is held on the holding frame, the tobacco leaves can be easily stripped off the stalk. The stripped off tobacco leaves drop down and are stacked, under the leaf-stripping rollers, onto the regions corresponding to the respective portions of the stalk; in this way, they are classified into groups. More specifically, the tobacco leaves are collected in such a manner that those on the base portion of the stalk, those on the intermediate portion, and those on the tip portion are divided from one another.

Using the leaf-stripping machine of the present invention, the operator is required only to rotate each tobacco stalk about its longitudinal axis, after he places it on the holding frame. By doing so, all the tobacco leaves can be stripped off the stalk and simultaneously divided into different groups. Therefore, use of the machine of the present invention ensures easy stripping of tobacco leaves, thus improving the efficiency of the leaf-stripping operation.

In the leaf-stripping machine of the present invention, furthermore, the leaf-stripping rollers are essentially the only moving members, so that the construction of the machine is very simple.

DETAILED DESCRIPTION OF THE PREFERRED EMBODIMENTS

Figure 1:
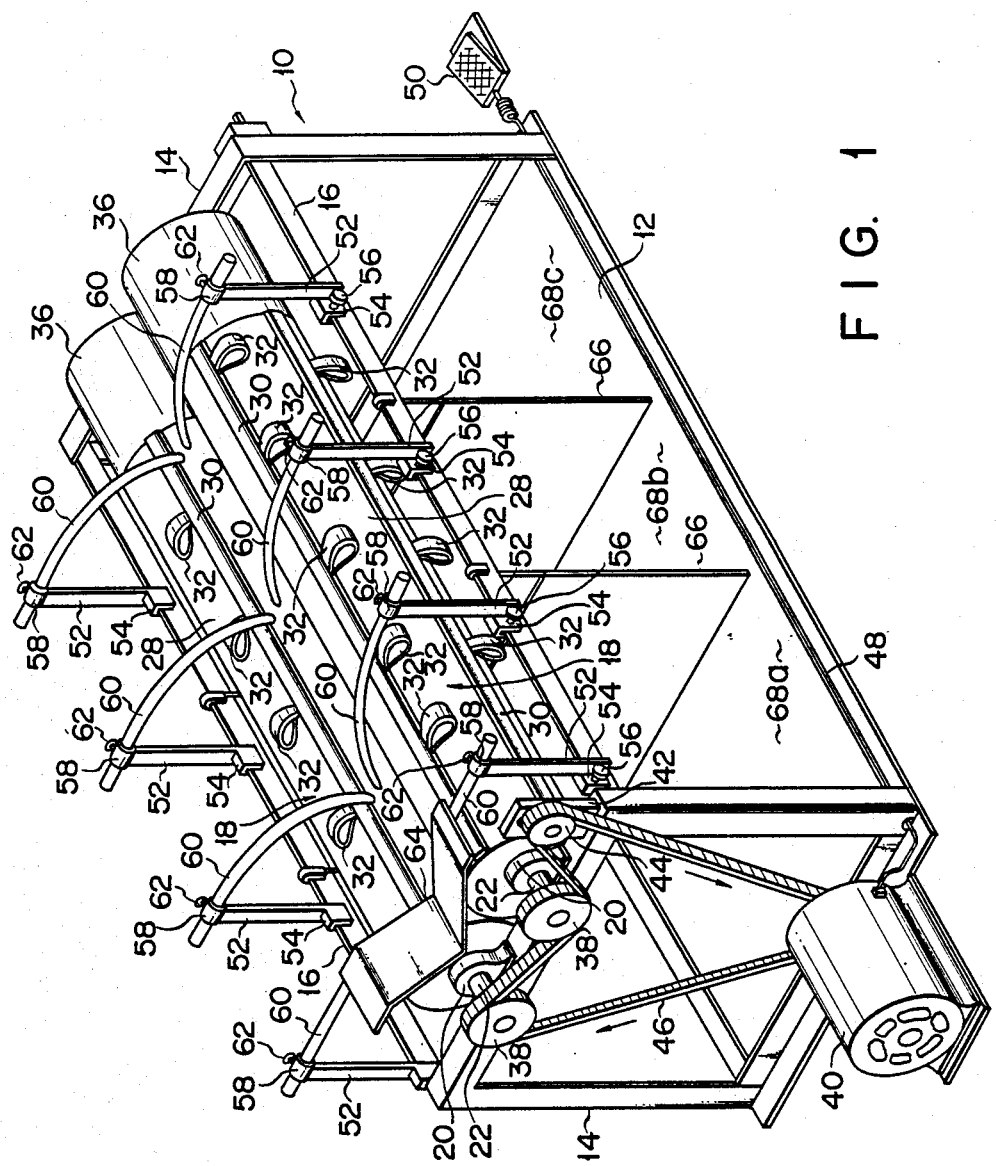
FIG. 1 is a perspective view illustrating a leaf-stripping machine according to one embodiment of the present invention.

Referring to FIG. 1, the tobacco leaf-stripping machine is provided with machine frame 10. Machine frame 10 includes long rectangular base plate 12, and a pair of support legs 14 which project upright at the respective ends of base plate 12, in such a manner as to face each other. A pair of support beams 16, extending parallel to base plate 12, are provided to connect the facing upper corners of support legs 14.

A pair of leaf-stripping rollers 18 are located between support legs 14. Leaf-stripping rollers 18 extend parallel to and are in rolling contact with each other. Leaf-stripping rollers 18 are rotatably supported, at each end, on corresponding support legs 14, by use of bearings 20. Accordingly, two bearings 20 are attached to each support leg 14. In FIG. 1, however, only the bearings attached to one of support legs 14 are illustrated.

Leaf-stripping rollers 18 will now be explained in detail. Since the construction of one roller 18 is the same as that of the other, reference will be made to only one of them.

Leaf-stripping roller 18 includes central shaft 22. This central shaft is rotatably supported, at each end, by bearings 20. It should be noted that one end of central shaft 22 projects from bearings 20, as is shown in FIG. 1. Drum 24, made of a non-elastic material, is attached on the outer circumference of central shaft 22, except for the other end portion of central shaft 22. The outer circumference of drum 24 is covered with sponge layer 26 of improved elasticity, and the outer circumference of sponge layer 26 is covered with rubber layer 28. With this construction, a pair of leaf-stripping rollers 18 are in rolling contact with each other at rubber layers 28.

A plurality of long sheets 30 are attached to the outer circumference of rubber layer 28, such that they extend in the axial direction of central shaft 22. Sheets 30 are rubber sheets with a predetermined thickness and arranged at regular intervals in the circumferential direction of rubber layer 28. It should be noted that long sheets 30 on one leaf-stripping roller 18 do not come into contact with those on the other when rollers 18 are rotated at the same speed and in opposite directions, as indicated by the arrows in FIG. 2. A plurality of leaf-drawing ribbons 32 are partially clamped and held between long sheets 30 and rubber layer 28 of each leaf-stripping roller 18. Leaf-drawing ribbons 32 are rubber bands and are arranged in the longitudinal direction of each long sheet 30 at predetermined intervals. When leaf-stripping rollers 18 are rotated in the directions indicated by the arrows in FIG. 2, leaf-drawing ribbons 32 are rotated along with the rotation of each leaf-stripping roller 18. At this time, the sections at which ribbons 32 are attached to long sheets 30 are rotated as a leading head, as is clear from FIGS. 1 and 2.

Figure 3:
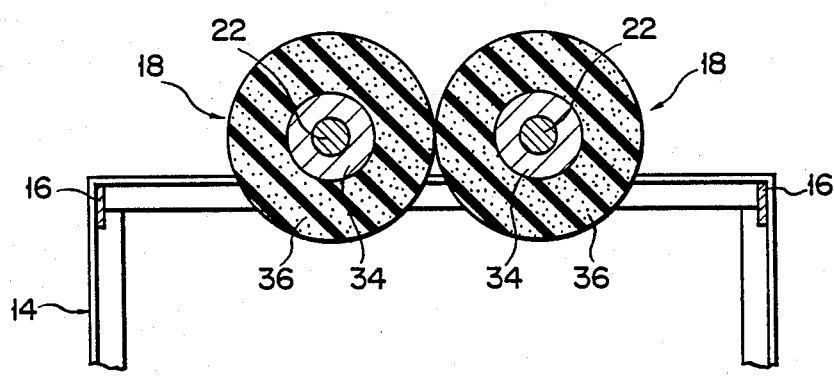
FIG. 3 is a cross section illustrating an end section of a pair of leaf-stripping rollers used in the machine shown in FIG. 1.

As is shown in FIG. 3, drum 34 is attached to that other end portion of central shaft 22 around which drum 24 is not provided. Like drum 24, drum 34 is formed of a non-elastic material, but it has a smaller diameter than that of drum 24. The outer circumference of drum 34 is covered with sponge layer 36. This sponge layer is similar to sponge layer 26, but has the same outer diameter as that of rubber layer 28. Since, therefore, sponge layer 36 is thicker than sponge layer 26, the elasticity of the former is superior to that of the latter.

As is shown in FIG. 1, pulley 38 is attached to one end of each central shaft 22, i.e., to the end projecting from bearings 20. Electric motor 40 is located under central shafts 22. Electric motor 40 has an output shaft to which a driving pulley is connected. (In FIG. 1, neither the output shaft nor the driving pulley is shown.) Bracket 42 protrudes upward from support leg 14 located close to electric motor 42. Tension pulley 44 is rotatably supported by bracket 42. The location of tension pulley 44 is adjustable relative to bracket 42.

Endless driving belt 46 is used in the manner shown in FIG. 1, Whereby it connects the driving pulley of motor 40, pulleys 38, and tension pulley 44 to one another. When driving belt 46 travels in the direction indicated by the arrows in FIG. 1, pulleys 38 are rotated in opposite directions, thus rotating leaf-stripping rollers 18 in the directions indicated by the arrows in FIG. 2. Operation cord 48 extends from motor 40 to operation pedal 50. This operation pedal is located close to support leg 14 at the opposite end of the machine. The drive of motor 40 can be controlled by depressing operation pedal 50.

A plurality of support arms 52 project upward from each of support beams 16. Support arms 52 are arranged at predetermined intervals in the longitudinal direction of each support beam 16. Clamp 54 is attached to the lower end of each support arm 52, and each clamp 54 is detachably secured to the corresponding support beam by means of screw 56. Pipe 58 is attached to the upper end of each support arm 52, such that the axis of pipe 58 is perpendicular to that of leaf-stripping rollers 18. Holding rod 60 is inserted into the pipe of each support arm 52, and is detachably secured to the corresponding pipe by means of screw 62.

Figure 2:
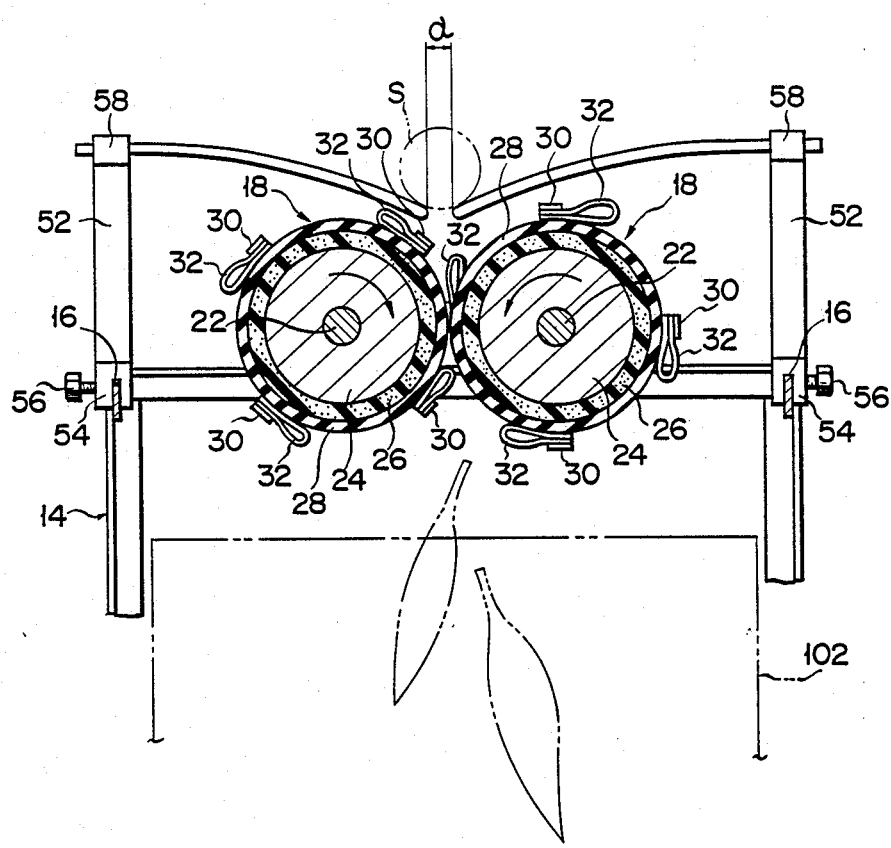
FIG. 2 is a cross section of the machine shown in FIG. 1.

As is shown in FIGS. 1 and 2, support arms 52 of one support beam 16 are associated with those of the other, such that holding rods 60 constitute a plurality of pairs. Holding rods 60 of each pair extend toward each other while curving downward. As is shown in FIG. 2, gap a, defined between the tips of holding rods 60 of each pair, is located above the contact point of leaf-stripping rollers 18. Gap a is determined to be shorter than the diameter of a tobacco stalk; it is in the range of 5 to 15 mm, for example. The size of gap a can be adjusted by loosening screws 62 and by shifting rods 60 in their axial direction.

In the above embodiment, holding plate 64 is attached to the pair of holding rods 60 nearest to electric motor 40. Holding plate 64 is V-shaped, so that its sharp edge faces the contact point between leaf-stripping rollers 18. Holding plate 64 serves to hold the base portion of the tobacco stalk.

In the inside of machine frame 10, two partitioning plates 66 are located under leaf-stripping rollers 18. As is shown in FIG. 1, partitioning plates 66 are suspended from support beams 16, and partition the inside of machine frame 10 into three sections 68a, 68b, and 68c, which are arranged side by side in the axial direction of leaf-stripping rollers 18.

Next, the operation of the above leaf-stripping machine will be described.

The operator stands on the side of operation pedal 50 and steps on operation pedal 50. By so doing, a pair of leaf-stripping rollers 18 are rotated in the opposite directions indicated by the arrows in FIG. 2.

The operator then places a tobacco stalk, which has been dried beforehand, onto support rods 60, in such a manner that the stalk is parallel to the axes of leaf-stripping rollers 18. The base portion of the stalk is placed on holding plate 64, and the tip portion of the stalk is supported by the operator, with his hands. Since each holding rod 60 is curved downward, as is shown in FIGS. 1 and 2, and since gap a between the tips of holding rods 60 of each pair is determined to be smaller than the diameter of the tobacco stalk, the stalk is reliably guided to the position between the tips of holding rod 64 and is held there, as indicated by s in FIG. 2. Stalk s will not pass through gap a and drop onto leaf-stripping rollers 18, at this point.

Stalk s is securely held by holding rod 60, as mentioned above. However, the tobacco leaves protruding from stalk s hang down, in the direction of leaf-stripping rollers 18, by their own weight. The leaves touching rollers 18 are drawn therebetween, by the rotation of the rollers, whereby they are stripped off stalk s and then drop. By rotating stalk s about its longitudinal axis, all the leaves protruding radially from the stalk are stripped off, and are allowed to drop from the leaf-stripping rollers. Since the base portion of stalk s is supported on holding plate 64, stalk s is easy to rotate.

The leaf-stripping operation will now be explained in more detail.

As has been mentioned above, a plurality of long sheets 30 are disposed on each leaf-stripping roller 18, while spaced from each other in the circumferential direction of roller 18. Since sheets 30 serve to prevent the tobacco leaves from slipping on rollers 18, the leaves are therefore reliably stripped off stalk s and discharged from rollers 18. Furthermore, since a large number of leaf-drawing ribbons 32 are attached to each sheet 30, the drawing in of the tobacco leaves is accelerated, with the result that they can be stripped off stalk s with high efficiency.

As is mentioned above, gap a is defined between the tips of each pair of holding rods 60. Because of this gap, holding rods 60 do not become an obstacle to the tobacco leaves being drawn between leaf-stripping rollers 18.

The tobacco leaves stripped off stalk s drop into the inside of machine frame 10. The interior of this machine frame is divided into three sections 68a, 68b, and 68c, by two partitioning plates 66, as mentioned above, so that the dropping leaves are stored in these partitioned sections. Specifically, the tobacco leaves of the base portion of stalk s, those of the intermediate portion thereof, and those of the tip portion thereof are collected in sections 68a, 68b, and 68c, respectively. In this manner, the tobacco leaves can be collected in the corresponding sections, being classified according to the portions of the stalk.

When using the leaf-stripping machine of the present invention, the operator stands close to leaf-stripping rollers 18. However, the outer circumference of each roller 18 near to the operator is covered with sponge layer 36, which is thick and has excellent elasticity. Therefore, the operator will not be injured, even if his hands becomes clamped between leaf-stripping rollers 18.

Figure 4:
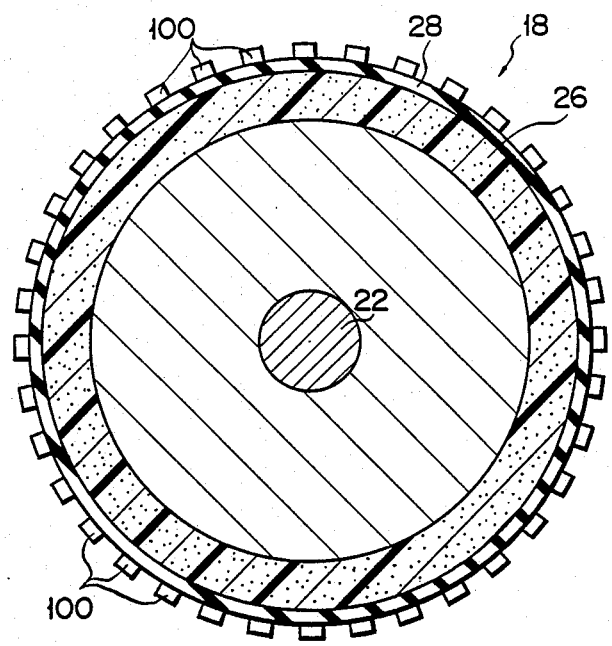
FIG. 4 is a cross section of the rollers according to a modification of the present invention.
Figure 5:
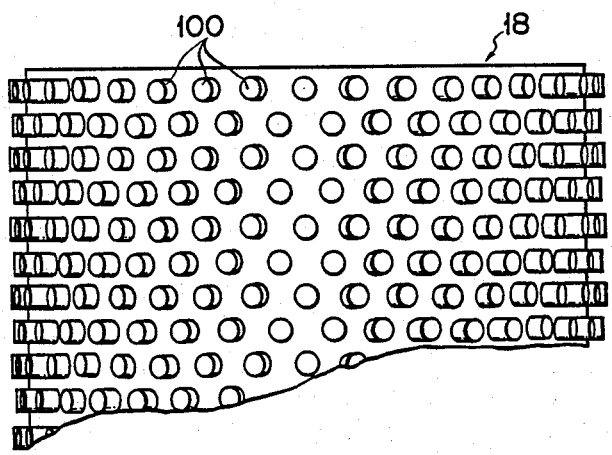
FIG. 5 is a plan view illustrating part of the circumferential surface of the rollers shown in FIG. 4.

The present invention is not limited to the embodiment described above. For example, the invention may be modified in the manner shown in FIGS. 4 and 5. According to this modification, a large number of projections 100 are formed on the outer circumferential surface of at least one of leaf-stripping rollers 18. Projections 100 are formed integrally with rubber layer 28 and are uniformly distributed over the outer surface thereof. The function of these projections is similar to that of sheets 30 and ribbons 32 used in the aforementioned embodiment.

In the aforementioned embodiment, the tobacco leaves stripped off the stalk are divided into groups, by use of partitioning plates 66. However, the use of partitioning plates 66 does not limit the present invention. Instead of using partitioning plates 66, a plurality of collecting boxes 102, which are open at the top, may be arranged under leaf-stripping rollers 18, as indicated by the two-dot and chain lines in FIG. 2. The use of such collection boxes facilitates the collection of the stripped tobacco leaves.

What is claimed is:

1. A leaf-stripping machine for stripping tobacco leaves off a stalk of a tobacco plant, comprising:
   a pair of leaf-stripping rollers having substantially the same length as the stalk of the tobacco plant, the rollers extending longitudinally parallel to each other, the rollers being supported in such a manner that they are rotatable in rolling contact with each other;
   a holding frame which is so located above the paired leaf-stripping rollers as to be spaced therefrom by a predetermined distance, the holding frame allowing the tobacco stalk to be held in parallel to the leaf-stripping rollers, and permitting the tobacco leaves on the stalk to hang down to be stripped off by the leaf-stripping rollers;
   drive means for rotating the paired leaf-stripping rollers in opposite directions, so as to draw the tobacco leaves therebetween, whereby the tobacco laves are drawn in further, by the rotation of the leaf-stripping rollers and are finally stripped off the stalk; and
   a plurality of holding rods, on said holding frame, arranged at predetermined intervals in the longitudinal direction of the leaf-stripping rollers, and which extend perpendicular to the longitudinal direction.

2. A leaf-stripping machine according to claim 1, wherein the holding rods are sequentially paired and have a central portion which is located between the leaf-stripping rollers, and is curved downward toward the leaf-stripping rollers.

3. A leaf-stripping machine according to claim 2, wherein the central portion of each holding rod is cut away in such a manner as to provide a gap smaller than the diameter of the stalk.

4. A leaf-stripping machine according to claim 3, wherein the holding frame further includes a holding plate which is located above one end of the leaf-stripping rollers, and on which a base portion of the stalk is placed.

5. A leaf-stripping machine according to claim 1, wherein at least one of the leaf-stripping rollers has an outer circumferential portion which is elastically deformable, and an outer surface of this outer circumferential portion is provided with long sheets which have a constant thickness, are arranged at predetermined intervals in the circumferential direction of the leaf-stripping roller, and extend parallel to the longitudinal axis of the leaf-stripping roller.

6. A leaf-stripping machine according to claim 5, wherein a large number of ribbons are inserted, at one end, between each long sheet and the corresponding leaf-stripping roller, such that the ribbons are arranged at predetermined intervals in the longitudinal direction of the long sheet.

7. A leaf-stripping machine according to claim 1, wherein at least one of the leaf-stripping rollers has an outer circumferential portion which is elastically deformable, and a large number of projections are distributed over the outer surface of the outer circumferential portion.

8. A leaf-stripping machine for stripping tobacco leaves off a stalk of a tobacco plant, comprising:

- a pair of leaf-stripping rollers having substantially the same length as the stalk of the tobacco plant, the rollers extending longitudinally parallel to each other, the rollers being supported in such a manner that they are rotatable in rolling contact with each other;
- a holding frame which is so located above the paired leaf-stripping rollers as to be spaced therefrom by a predetermined distance, the holding frame allowing the tobacco stalk to be held in parallel to the leaf-stripping rollers, and permitting the tobacco leaves on the stalk to hang down to be stripped off by the leaf-stripping rollers;
- drive means for rotating the paired leaf-stripping rollers in opposite directions, so as to draw the tobacco leaves therebetween, whereby the tobacco leaves are drawn in further, by the rotation of the leaf-stripping rollers and are finally stripped off the stalk; and
- means for receiving the leaves stripped off the stalk, said means being disposed below the pair leaf-stripping rollers and partitioned in a direction perpendicular to the longitudinal direction of the leaf-stripping rollers to provide a plurality of receiving sections, the leaves stripped off the stalk being distributed to the receiving sections depending on the positions on the stalk from which the leaves have been stripped.

* * * * *